(12) United States Patent
Taylor

(10) Patent No.: US 9,954,903 B2
(45) Date of Patent: Apr. 24, 2018

(54) INDUSTRIAL NETWORK SECURITY TRANSLATOR

(71) Applicant: Monico Monitoring, Inc., Spring, TX (US)

(72) Inventor: Jonathon Taylor, Peoria, IL (US)

(73) Assignee: Monico Monitoring, Inc., Spring, TX (US)

( * ) Notice: Subject to any disclaimer, the term of this patent is extended or adjusted under 35 U.S.C. 154(b) by 135 days.

(21) Appl. No.: 14/932,774

(22) Filed: Nov. 4, 2015

(65) Prior Publication Data

US 2017/0126745 A1    May 4, 2017

(51) Int. Cl.
*H04L 29/06*    (2006.01)

(52) U.S. Cl.
CPC ........ *H04L 63/205* (2013.01); *H04L 63/0227* (2013.01); *H04L 63/0263* (2013.01); *H04L 63/0823* (2013.01); *H04L 63/1425* (2013.01)

(58) Field of Classification Search
CPC .................................. H04L 9/00; G06F 12/00
See application file for complete search history.

(56) References Cited

U.S. PATENT DOCUMENTS

| | | | | |
|---|---|---|---|---|
| 2009/0303883 | A1* | 12/2009 | Kucharczyk | H04L 12/4645 370/241 |
| 2012/0254995 | A1* | 10/2012 | Sallam | G06F 21/554 726/22 |

* cited by examiner

*Primary Examiner* — Joseph P Hirl
*Assistant Examiner* — Leynna Truvan
(74) *Attorney, Agent, or Firm* — Carr & Ferrell LLP

(57) ABSTRACT

Embodiments of the present technology relate to a system for providing intrusion detection for industrial control systems, comprising serial data links to communicate with serial-based networks, Ethernet interfaces to communicate with industrial and enterprise networks, a protocol recognition engine to break down an incoming data packet by protocol and integrate the data into an Ethernet framework, an industrial control system recognition application to detect intrusions, a traffic analytics application to analyze traffic activity for abnormal traffic activity, a logfile creation application to poll industrial equipment and create a logfile of equipment statuses, a long term system deviation analysis application to monitor raw data of the industrial equipment to create a profile of long term system activity, a rule set to allow data that matches the rule set and flag data that does not match the rule set, and an alerts engine to alert a system administrator of suspect activity.

21 Claims, 4 Drawing Sheets

INDUSTRIAL NETWORK SECURITY TRANSLATOR

TECHNICAL FIELD

The present technology relates generally to network security, and, more particularly, to systems and methods for network intrusion detection in Industrial Control System (ICS) networks.

BACKGROUND

Traditionally, networks for ICSs, including but not limited to industries such as water, oil, gas, electrical, automated manufacturing, transportation, and industrial autonomous vehicles, were segregated from and physically incompatible with corporate information technology (IT) systems. However, modern demands for production and maintenance information has led to the integration of corporate IT systems and ICS systems, resulting in increased risk to both business and critical infrastructures.

The Stuxnet virus was the first major virus to attack physical ICS networks by compromising the programmable logic controllers (PLCs) at the center of the control process. In addition to compromising the service laptops at a nuclear enrichment facility, new software was installed to the PLC and, a rootkit was installed within the PLC code to run malicious code that compromised the system control loop.

It should be apparent from the foregoing that there is a need to provide network intrusion detection in ICS networks.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present technology is directed to a system for providing intrusion detection for industrial control systems, comprising: at least one serial data link to communicate with serial-based networks; at least one Ethernet interface to communicate with industrial and enterprise networks; at least one processor and memory communicatively coupled to the processor, the memory storing instructions executable by the system; a protocol recognition engine executed by the processor and configured to break down an incoming data packet by protocol and integrate the data into an Ethernet framework; an industrial control system protocol recognition application executed by the processor and configured to detect intrusions; a communications traffic analytics application executed by the processor and configured to analyze traffic activity for abnormal traffic activity; a system logging application executed by the processor to poll industrial equipment, and create a logfile of equipment statuses; a long term system deviation analysis application executed by the processor and configured to monitor raw data of the industrial equipment to create a profile of long term system activity; a rule set executed by the processor and configured to allow data that matches the rule set and flag data that does not match the rule set; a reports engine executed by the processor to provide health and status information regarding the state of the industrial network; and an alerts engine executed by the processor and configured to alert a system administrator of suspect activity.

According to other embodiments, the present technology is directed to a method for providing intrusion detection for industrial control systems.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Embodiments of the present disclosure are directed to systems and methods for network intrusion detection in ICS networks.

In some embodiments, the industrial network security translator described herein with reference to the collective drawings is focused on network intrusion detection in ICS systems that were previously inaccessible to all other security solutions. By combining hardware device security, non-intrusive network monitoring, analytics, and enterprise-grade firewall technology, the industrial network security translator platform will provide real-time monitoring and full integration with existing IT security infrastructure. Identifying unauthorized or malicious activity in real time allows the network and companies to protect themselves before systems are compromised and physical or monetary damages occur. Additionally, the enclosure of the industrial network security translator platform in a hardened, sealed housing makes the platform ideal for remote monitoring and telematics applications for both fixed and mobile assets.

Recent data breaches of ICS systems have shown that a complete security solution is necessary for industrial networks. Exemplary markets that would benefit from the systems and methods described herein include, but are not limited to, critical control systems in utilities from local to federal levels (i.e., electric, nuclear, etc.), regional utility providers (i.e., water or waste water), natural gas gathering and transmission, oil and chemical refineries, private sector automated or monitored manufacturing equipment, critical transportation segments, automated building control systems (including access controlled locations), rail system monitoring, government emergency systems, critical control systems in any industry, and may extend to industrial autonomous vehicles, aircrafts, and large mobile platforms.

These and other advantages of the present technology are described herein with reference to the collective drawings.

Figure 1:
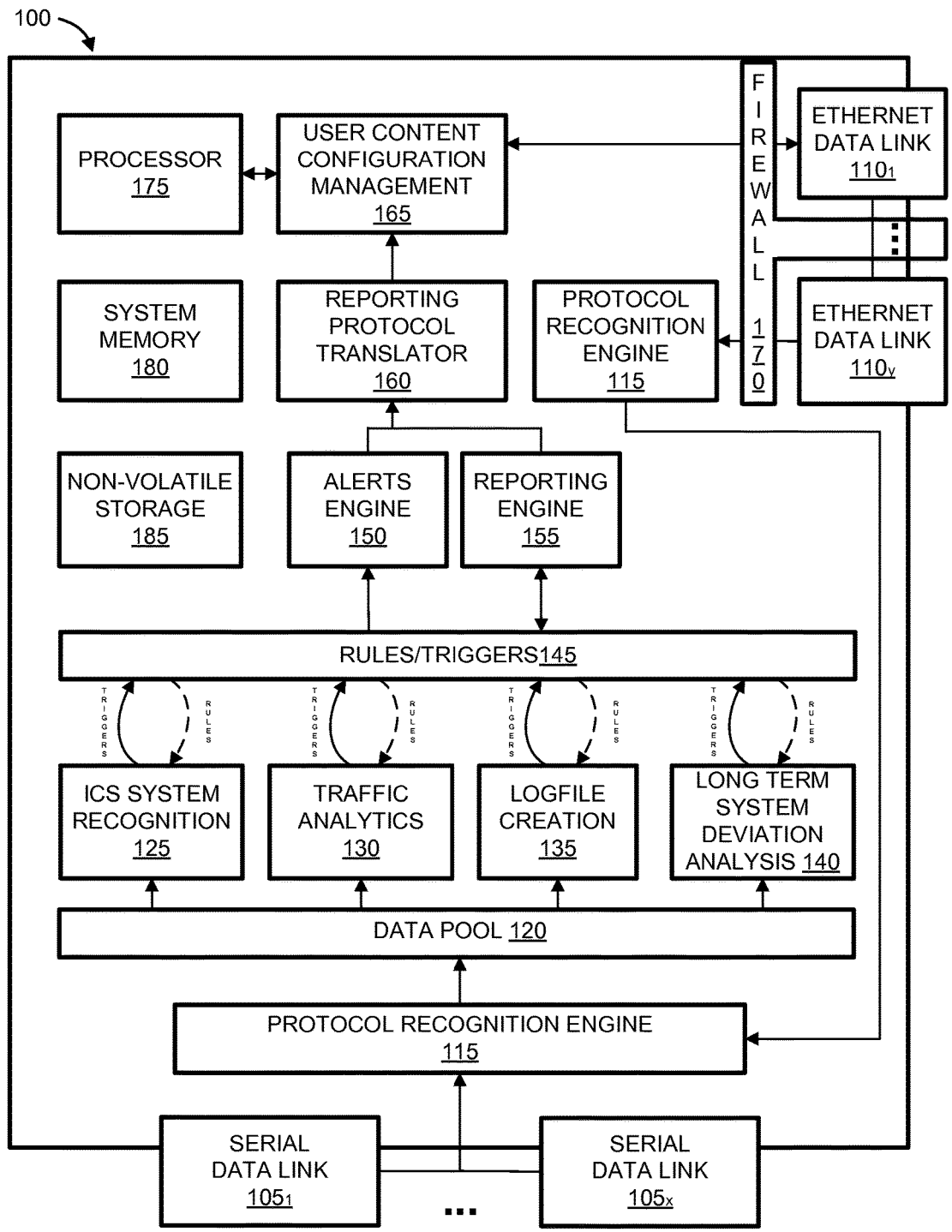
FIG. 1 is a simplified block diagram of a system according to exemplary embodiments of the present technology.

FIG. 1 is a simplified block diagram of a system 100 according to exemplary embodiments of the present technology. The architecture comprises an intrusion detection system that is configured to provide various functionalities, which are described in greater detail throughout the document. According to some embodiments, system 100 includes functionalities of an industrial translator, a device gateway, a secure edge router, or an onboard analytics engine. Generally, the system 100 is configured to communicate with industrial engines, supervisory control and data acquisition (SCADA) systems, ICS systems, and other serial-based networks through serial data links $105_1$-$105_x$. For example, system 100 may include, but are not limited to, CAN, Cat Data Link (CDL), RS-485, R-232, and any other serial data links. A variety of serial communications protocols are supported by system 100, for example, via serial data links $105_1$-$105_x$, including but not limited to J1939, CDL, Modbus RTU, BACnet MS/TP, and any other serial communications protocol. Additional communications interfaces supported by system 100 include, but are not limited, to USB and Ethernet data links $110_1$-$110_y$. According to some embodiments, the Ethernet interfaces are on physically separate media to provide isolation between the ICS network and the enterprise IT network.

Serial data received from the serial-based networks through serial data links $105_1$-$105_x$ are sent to protocol recognition engine 115. The processing of protocol recognition engine 115 may vary depending on each protocol. According to particular embodiments, the protocol recognition engine knows the message byte content, also referred to herein as mapping, or each supported protocol and uses the mapping to extract information from the packet. The protocol information can be proprietary or common knowledge depending on the protocol used. Once the protocol map is applied, relevant information is masked out of the packet as a whole, proprietary attributes are added that allow for easier sorting and identification of packet contents and intended purpose, and the data is sorted into processing streams where the resultant data streams are individually evaluated. For example, protocol recognition engine 115 can break down a serial data packet into a read request, a write request, determine whether the serial data packet is trying to program a device, or determine whether the serial data packet is polling for information that is restricted or unneeded by the requesting device, for example, determining how a field in the serial data packet is setup or what the data type is. Generally, serial data is processed by protocol-specific programs, where a separate program is required for each physical link and protocol combination. However, by breaking down a serial data packet and integrating the data into an Ethernet framework to standardize the tracking of features, such as source, destination, message type, flags, and other advanced filtering, existing packet filtering tools, such as Wireshark or tcpdump, can be used. Additionally, the processing of protocol recognition engine 115 is essential in identifying which packets need further inspection and which packets can be counted for traffic bandwidth. In some embodiments, the sorted data streams are recombined into a standard Ethernet packet by using each stream to fill an Ethernet packet header field or the data payload field.

Additionally, protocol recognition engine 115 can determine which networks are active and who are the participants on each network through protocol recognition engine's 115 extensive knowledge of serial protocols used by different manufacturers and Ethernet protocols. With this information, protocol recognition engine can filter the information based on allowable rules/triggers 145. For example, a PLC interacting with a piece of automation machinery is constantly writing data updates for what is occurring in the machinery. If someone sends a message that is intended to reprogram the flash memory, reprogram the application memory, start polling for data types support, or perform any behaviors outside of normal operations, the protocol recognition engine 115 can recognize these behaviors within the protocol, and flag these behaviors as abnormal. In some embodiments, an additional protocol recognition engine 115 receives data sent from Ethernet data links $110_1$-$110_y$. For example, if system 100 were attacked by the Stuxnet virus, the protocol recognition engine 115 would identify serial Modbus messages that are specifically used to reprogram a PLC.

The data processed by protocol recognition engine 115 enters data pool 120 which makes the sorted and flagged packets available for consumption by various applications to analyze without recreating the information in order to assist with real-time analysis. Each application, such as an ICS system recognition 125 application, a traffic analytics 130 application, a logfile creation 135 application, and a long term system deviation analysis 140 application, can pull the processed data packets and run independent functions on them.

Figure 2:
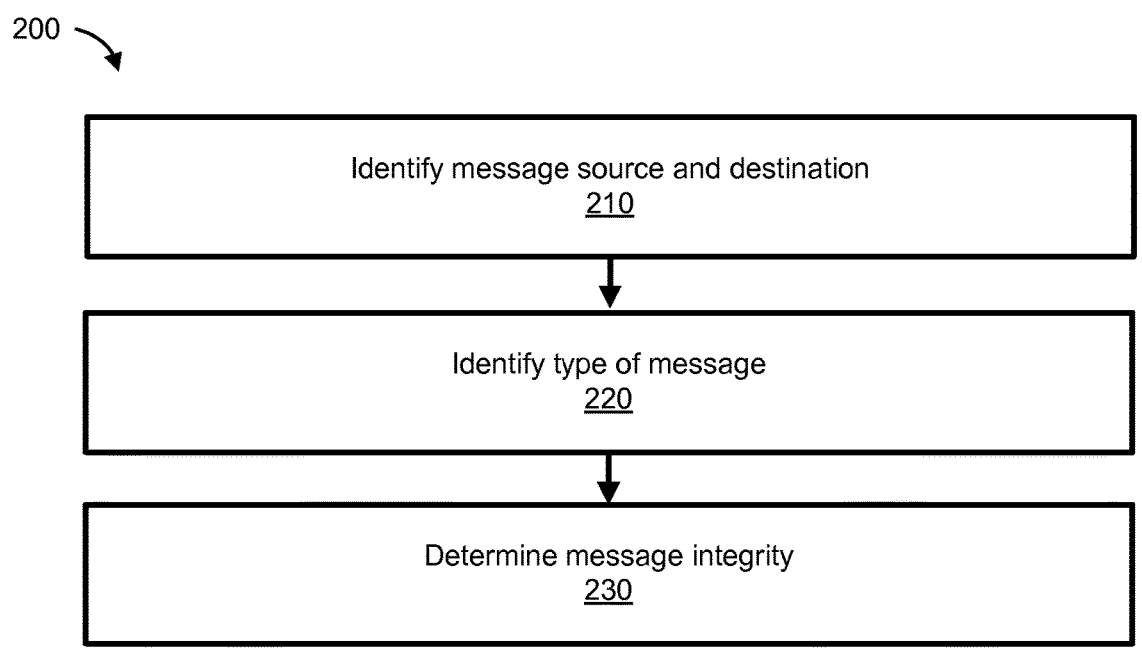
FIG. 2 is a flow diagram illustrating an example method of intrusion detection according to exemplary embodiments of the present technology.

In various embodiments, ICS system recognition 125 application processes the data for suitability of behavior with the ICS system, which includes but is not limited to, acceptable read/write behavior, acceptable programming behavior, and known network entity matching. If a packet does not conform to the expected ICS behavior, the packet is flagged and sent to the rules/triggers 145 engine. FIG. 2 is a flow diagram illustrating an example method of intrusion detection according to exemplary embodiments of the present technology. FIG. 2 illustrates a method 200 for detecting intrusions within an ICS network. At step 210, the method begins by filtering every message by source and destination to build a list of active participants on the network such as other PLCs, other destinations, or source information from sensors. In some embodiments, this can be accomplished through hardware layer addressing or extracting source and destination data from a message header. Typically, PLC systems don't change very often or if ever, and system administrators rarely ever make changes to PLC systems. Therefore, once a list of active participants on the network is created and by sorting the messages by who created the message, the ICS system recognition 125 application would first be able to detect an intrusion if the list of active participants changes. For example, a hacker will usually attempt to claim an address that is not likely to be used and starts searching for information or polling different addresses in an attempt to find out who the participants are on the network. The ICS system recognition 125 application can detect new participants to the network and alert the system owners or operators to the change in network status.

At step 220, the method further filters the message by protocol content. By filtering a message by protocol content, the ICS system recognition 125 application is able to determine whether the message's intended function is an action that the source should be sending. For example, a sensor sending information on the network should never be sending a message that attempts to find out data types or tries to reprogram the PLC. Therefore, if the message function varies for the source sending the message, this provides an indication that there may be an issue on the network or a new malicious or unauthorized participant on the network. The identification of the message's intended function relies heavily on protocol recognition engine 115 since the identifier is different in every protocol. In some embodiments, the information can be in the message header or the message body.

At step 230, the method continues by checking the message integrity of messages on the network. Typically, a message is fully populated, and CRC (cyclic redundancy check) confirms the right data type and data length. However, a popular method of interfering with industrial networks is message fuzzing by inputting massive amounts of random data to discover coding errors and security loopholes. The ICS system recognition 125 application can monitor for those types of messages that produce mismatched CRCs, mismatched lengths, or invalid packets, identify the malicious participants on the network, and notify system administrators.

In addition to detecting intrusions, the ICS system recognition 125 application can assist in identifying faulty or damaged equipment when checking the message quality of messages on the network. For example, in faulty equipment, bit errors can be generated in the message body, producing mismatched CRCs. The ICS system recognition 125 application would notify the system administrator in the event of mismatched CRCs, mismatched lengths, or invalid packets, allowing the faulty equipment to be identified and replaced before complete failure.

Returning to FIG. 1, the traffic analytics 130 application captures and analyzes not only the message content but also the amount of traffic on the network. Typically, PLC systems are very static systems, and there should not be traffic variations in the network. If there are any variations, typically they are time-based (i.e., the PLC system shuts off at night and turns back on in the morning, etc.). In some embodiments, the traffic analytics 130 application analyzes traffic in both a time sequence and a frequency sequence which can alert the system administrator of spikes in traffic that stand out as abnormal (i.e., the network is accessed at an unauthorized time of day). These analytics can be used to create models of the system traffic for short-term spikes and alerts, as well as long term health reports. In various embodiments, if the intrusion detection steps discussed above in FIG. 2 were to fail, the system administrator would still be able to detect an intrusion by noticing increased data link traffic based on the traffic analysis.

The logfile creation 135 application captures and stores a short-term log of all traffic in system 100. If a system event is triggered, logfile creation 135 application can export the short-term log for use as a forensic tool or post-event evaluation. Typically, ICS systems have not been able to participate in log analysis to identify unwanted behavior in a network environment like traditional IT systems can because PLCs do not natively support log creation, and each manufacturer stores critical information in different areas or register addresses. Also, storage space on industrial devices like PLCs is extremely limited and log files can take up large amounts of space. Logfile creation 135 application polls PLCs, HMIs (Human Machine Interfaces), or other equipment directly for any desired information, such as current running status, uptime, firmware version, last programming date, CPU usage, free memory, or active alarms, parses the data, and creates a log file, such as a corporate security industry standard syslog file, that resides on system 100. Furthermore, system 100 stores extensive knowledge regarding where critical information is stored in devices of different manufacturers and within manufacturers. In some embodiments, system users, system administrators, and engineers can automate and remotely retrieve the logs through standard Ethernet communications.

Once system 100 creates profiles of how the networks operates, including but not limited to, normal active network participants and network traffic, on a periodic basis, such as daily, monthly, or annually, and creates models of the traffic, the long term system deviation analysis 140 application can create long term network profiles for each device on the network. By using standard histograms (min/max/avg) and both short and long term trends, changes in the ICS network traffic patterns can be analyzed, and the system administrator or engineers can be notified of changes in performance trends. For example, if sensors start going down or if machines are dropping the communications links, the system administrator can view these deviations by comparison of current performance to the long term network profile.

Additionally, the long term system deviation analysis 140 application can construct models of measurements and values sent back between network entities. For example, if a pressure sensor is sending the same pressure value for a year and then that value starts to increase or decrease from that normalized value, the system administrator can be alerted that system 100 is moving out of tolerance via the alerts engine 150. The long term system deviation analysis 140 application can act both as an intrusion detection feature and also as a system health feature. In some embodiments, if the ICS system recognition 125 application, the traffic analytics 130 application, and the logfile creation 135 application have been circumvented, the long term system deviation analysis 140 application can determine if an intrusion or faulty equipment exists by monitoring and analyzing raw system values for changes over time. In the Stuxnet example discussed above as applied to an ICS network protected by system 100, the system administrator would have been notified that the raw data values from the valves were out of tolerance before the centrifuges were irreparably damaged.

Furthermore, system 100 has the ability to provide forensic evidence on network traffic data, where raw network data is captured for future analysis, which is currently not available for serial ICS systems. System 100 includes non-volatile storage 185 which may be a large onboard storage paired with compression capabilities that can allow for weeks or months worth of raw network traffic capture and storage. In some embodiments, non-volatiles storage 185 may be an eMMC (embedded MultiMediaCard) 4 GB, 8 bit, DDR2 (double data rate) Mode. System 100's large storage capacity and on-board compression combined with the long term network profiles allows system operators and investigators direct access to control networks to identify issues for periods of time only limited by system 100's storage capacity.

The rules/triggers 145 module is a bi-directional application that communicates with each of the IDS applications. It can be used by each application as a filter for packets that do not match standard communications for the relevant application. Also, rules/triggers 145 module can trigger a report or action based on criteria set in the user content configuration management 165 module. In some embodiments, rules/triggers 145 module are defined by the system manufacturer, whereas in other cases, system administrators can define rules specific to their installation, or a combination of both sources of rules may be implemented. In particular embodiments, if a data packet does not conform to the source application's rule set, the data packet is flagged by rules/triggers 145 module. If a data packet conforms to the source application's rule set, the data packet is allowed by rules/triggers 145 module. Rules/triggers 145 module will apply further processing to a data packet and determine if the packet justifies action through alerts engine 150. In some embodiments, the rules of rule/triggers 145 module are a combination of system defined proprietary rules and rules that are defined through user content configuration management 165 module, which allows system administrators to define what threshold and what frequency should be set for alerts. In the Stuxnet example discussed above as applied to an ICS network protected by system 100, rules/triggers 145 module would flag a reprogramming protocol as not allowed and trigger the notification routine.

If a data packet is flagged by rules/triggers 145 module as a violation, the flagged data packet is sent to alerts engine 150 which matches the offending data point to a communications plan of action. The communications plan uses a matrix based on severity, risk, and user settings to determine which communication methods will be used, and which user entities will be notified. In some embodiments, severity and risk are determined by an internal system definition, while user settings are imported from the user content configuration management 165 module. Once alerts engine 150 determines the appropriate communications for the offending packet, the raw report information is sent to the reporting protocol translator 160. In some embodiments, alerts engine 150 can generate notifications such as e-mails, system logs, alerts, events, SNMP (Simple Network Management Protocol) alerts, or any other notifications in real time. The notifications can be configured by the system administrator.

Reporting engine 155 uses input from user content configuration management 165 to create a schedule of reports to be run detailing the overall system health and vital statistics, for example, performance reports, machine trends, min/max/avg histograms, non-time sensitive health, system log, or status updates. Based on internal system hardware timing, reporting engine 155 will query the configured IDS application (i.e., ICS system recognition 125, traffic analytics 130, logfile creation 135, long term system deviation analysis 140, etc.) at a desired interval for a raw report data. In some embodiments, reporting engine 155 will create the appropriate reports and define the report recipients, for example, a company's IT management, security, or engineering personnel. Reporting engine 155 will send the completed bundle to reporting protocol translator 160 for proper formatting.

The reporting protocol translator 160 captures all system generated information and converts the output to a desired user format. The definitions for the output format are contained in the user content configuration management 165 module. Exemplary output formats include, but are not limited to, BACnet, SNMP, e-mail, ASCII Text, XML, or any format desired by the receiving user program.

The user content configuration management 165 module allows a system administrator to define what messages, what protocols the system administrator would like to be alerted on, and the level of alerting as well as other preferences. For example, if a system administrator does not want a large amount of alerting, the system administrator can adjust that preference. Additionally, the system administrator can choose to receive alerts on more specific and intensive areas.

In some embodiments, firewall 170 is a Linux firewall implemented via iptables to allow or block traffic to or from any Ethernet data link $110_y$. Each Ethernet network is independently isolated by firewall 170 to prevent access between networks unless specifically authorized. This allows IT administrators to control traffic flow into or out of the network, thereby protecting access to ICS Level 2 supervisory or monitoring devices, such as HMIs or SCADA software, and restricting any IT traffic on ICS networks. Firewall 170 protects system 100 and its connected endpoints from outside attacks. In various embodiments, system 100 can be used as a single point of entry (i.e., host device) or as an access point between internal and external networks. In particular embodiments, system 100 can be integrated into existing IT infrastructures, can support standard edge routing update protocols, such as OSPF and BGP, and can act as a secure edge router supporting NAT (Network Address Translation) and PAT (Port Address Translation), allowing system 100 to be used as a multi-device gateway. System 100 can also support secure remote protocols including certificate or password-based VPN connections and network layer access. Additionally, not only can system 100 act as a firewall between devices and an ICS network, but also system 100 can be attached to an ICS network as a silent, listen-only participant to detect abusive traffic that originates within the control network and does not pass through any existing firewall device. For instance, in the Stuxnet example, the laptops that infected the network would not have been stopped by a traditional IDS or firewall system because the laptops belonged to the service company and were technically behind the firewall. However, as a silent participant on the network, system 100 would have been able to detect abusive traffic from the laptops or from any other devices within the ICS system and notify IT. This non-intrusive approach ensures that the existing network and system performance are not affected, making it easy to integrate into legacy systems where any change can disrupt the system.

The system 100 in FIG. 1 generally comprises at least one processor 175, system memory 180, and non-volatile storage 185. Processor 175 can be an i.MX6 Quad Core processor or any microprocessor. In some embodiments, processor 175 can be an i.MX6 Quad Core processor used in industrial and automotive applications. In particular embodiments, processor 175 includes a secured cryptographic storage area protected by a permanently fused write process. Processor 175 allows system 100 to model real-time, multivariable data, and compare it to machine learning models to gauge real-time machine health and to generate actionable information for system users. In particular embodiments, system memory 180 can be 1 GB of RAM. Non-volatile storage 185 stores data utilized by processor 175 and one or more programming instructions which when executed by processor 175 implements one or more of the functionality of the present invention. In some embodiments, non-volatile storage 185 may be an eMMC 4 GB, 8 bit, DDR2 Mode. In particular embodiments, system 100 is a headless Linux server. As security issues are identified, system 100 can be updated and patched to defend against new threats.

System 100 may additionally include internal temperature sensors (at least one on die, at least one ambient air, at least one near power), real-time clock (comprising coin cell battery), software-monitored digital input to be used as reset switch (STG).

According to some embodiments, in order to target mobile platforms and stationary industrial platforms, all components of system 100 are industrial grade components operable at extended industrial temperature ranges such as from approximately −40° C. to +85° C. System 100 may also comprise input power isolation from approximately 8V to 48V to cover overvoltage and reverse polarity protection scenarios and a key switch (KSW) pin used to determine start up state and shutdown override. The wide input range makes system 100 ideal for mobile environments including but not limited to off-highway, marine, and locomotive.

Additionally, the components of system 100 may be Hazardous Location certified to operate in harsh environments such as flammable or explosive gases, liquids, or dusts. Protecting electrical equipment in hazardous location requires special considerations. For example, system 100 can be Class I Division II certified where system 100 can operate in locations where flammable gases or vapors are present in quantities sufficient to produce explosive or ignitable mixtures.

Furthermore, system 100 may be generally housed in a fully sealed enclosure that can withstand harsh environments. In some embodiments, the enclosure is IP67 certified where system 100 is at least totally protected against dust and protected against the effect of immersion between 15 cm and 1 m. The enclosure supports extended or industrial temperatures ranges, such as from approximately −40° C. to +85° C., and the device can function in approximately −40° C. to +70° C. ambient temperature range at high CPU loads. In particular embodiments, the enclosure is a metal housing desired for heat sink and grounding properties along with direct contact heat pipe for processor. Additionally, the enclosure may include LEDs for power and communication links where the LEDs are visible externally through the enclosure. In another particular embodiment, the size of the enclosure can be approximately 4¾ inches high by 3⅛ inches wide by 4½ inches deep. System 100 within a fully enclosed housing can be safely deployed in oil and gas applications, construction environments, explosive environments, factory or automated environments where heat and moisture make most gateway devices ineffective, and mounted externally in mining applications. The signaling requirements for ICS systems often require the equipment to be located on a factory floor, engine room, or other non-climate controlled environments.

Figure 3:
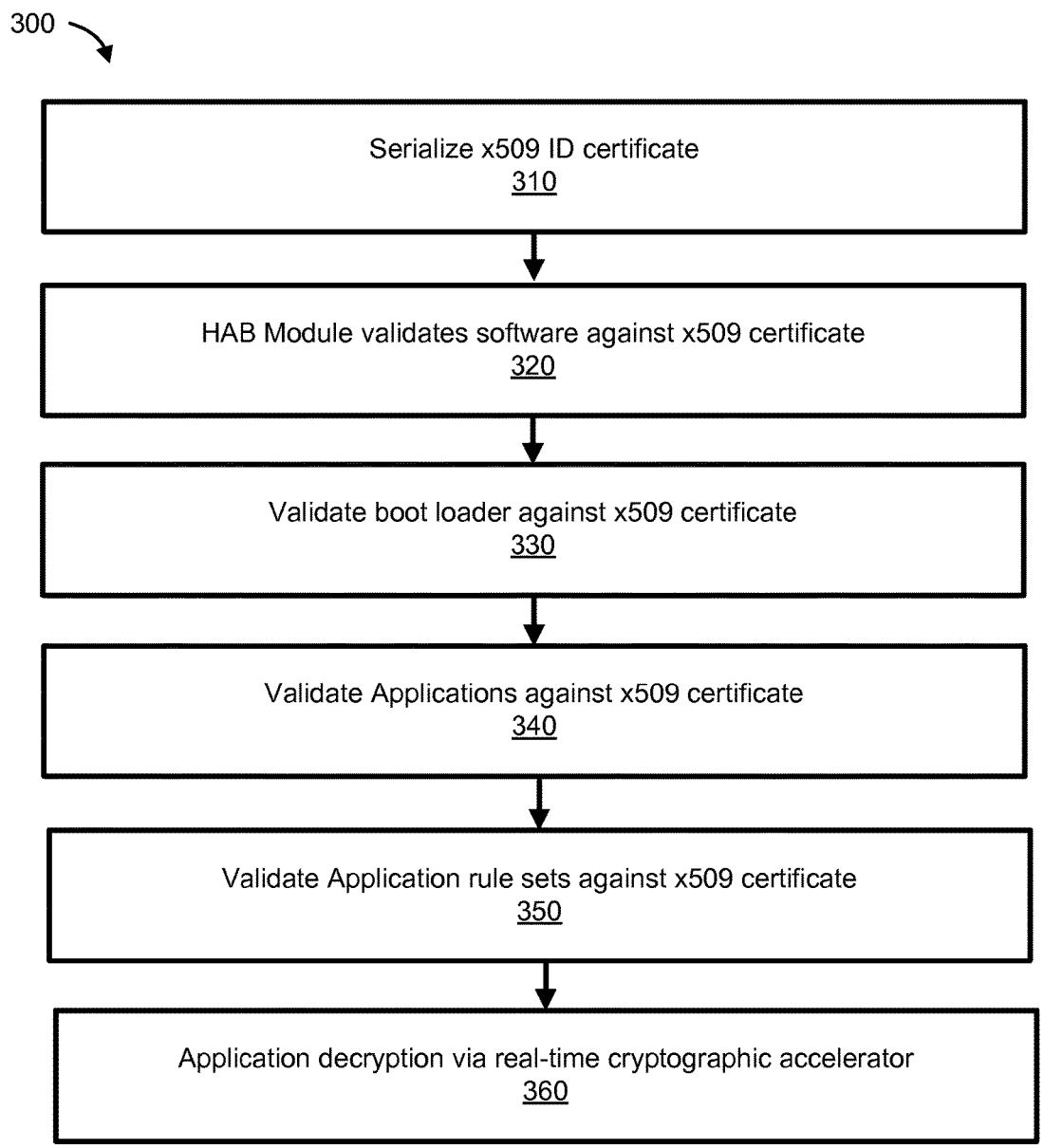
FIG. 3 is a flow diagram illustrating an example method of authenticating software according to exemplary embodiments of the present technology.

FIG. 3 is a flow diagram illustrating an example method 300 of authenticating software incorporating enterprise grade certificate security according to exemplary embodiments of the present technology. In some embodiments, processor 175 of system 100 is a TPM (Trusted Platform Module) that has a secure storage area for a cryptographic signature which is write protected by tamper resistant e-fuses. In some embodiments, the secure storage area contains an x509 certificate used for identification and validation of on-board systems and software. At step 310, the x509 ID certificate can be serialized so that each system 100 can have a unique certificate. If someone happens to compromise a certificate, only a single system is lost and the security of other systems left intact. Moreover, there is no learning curve advantage for breaking one system because each system is cryptographically unique. The x509 certificate is stored in the secure storage area of system 100 at manufacturing by integrating the x509 certificate into hardware and burning the e-fuses, thereby making the secure storage area read-only.

At step 320, the HAB (High Assurance Boot) module validates each level of software against the x509 device certificate before it executes. This is accomplished by creating a cryptographic hash of each software level's image and comparing the hash against a cryptographically signed hash of the intended software image. Once the HAB module is verified and starts, the boot loader is validated against the x509 certificate at step 330 and will continue to boot the OS. Once the OS is booted, each of the running applications are validated against the x509 certificate in step 340, and the applications will only boot if there is a match with the device certificate. At step 350, the rule sets for the applications are validated against the x509 certificate. In some embodiments, multiple x509 certificates are used to define each step of process 300, with each certificate being created from the individualized root certificate from system 100. At step 360, the applications are decrypted by running the applications through a real-time cryptographic accelerator. If someone were to physically or remotely access system 100 and look at the application storage area, no information can be gained due to the encryption of the storage area via the x509 certificate. If the cryptographic verification of process 300 fails at any step in the process, system 100 will fail to boot and revert to a service-only mode. In a service-only mode, all protected applications and data will be unreadable by all parties.

Figure 4:
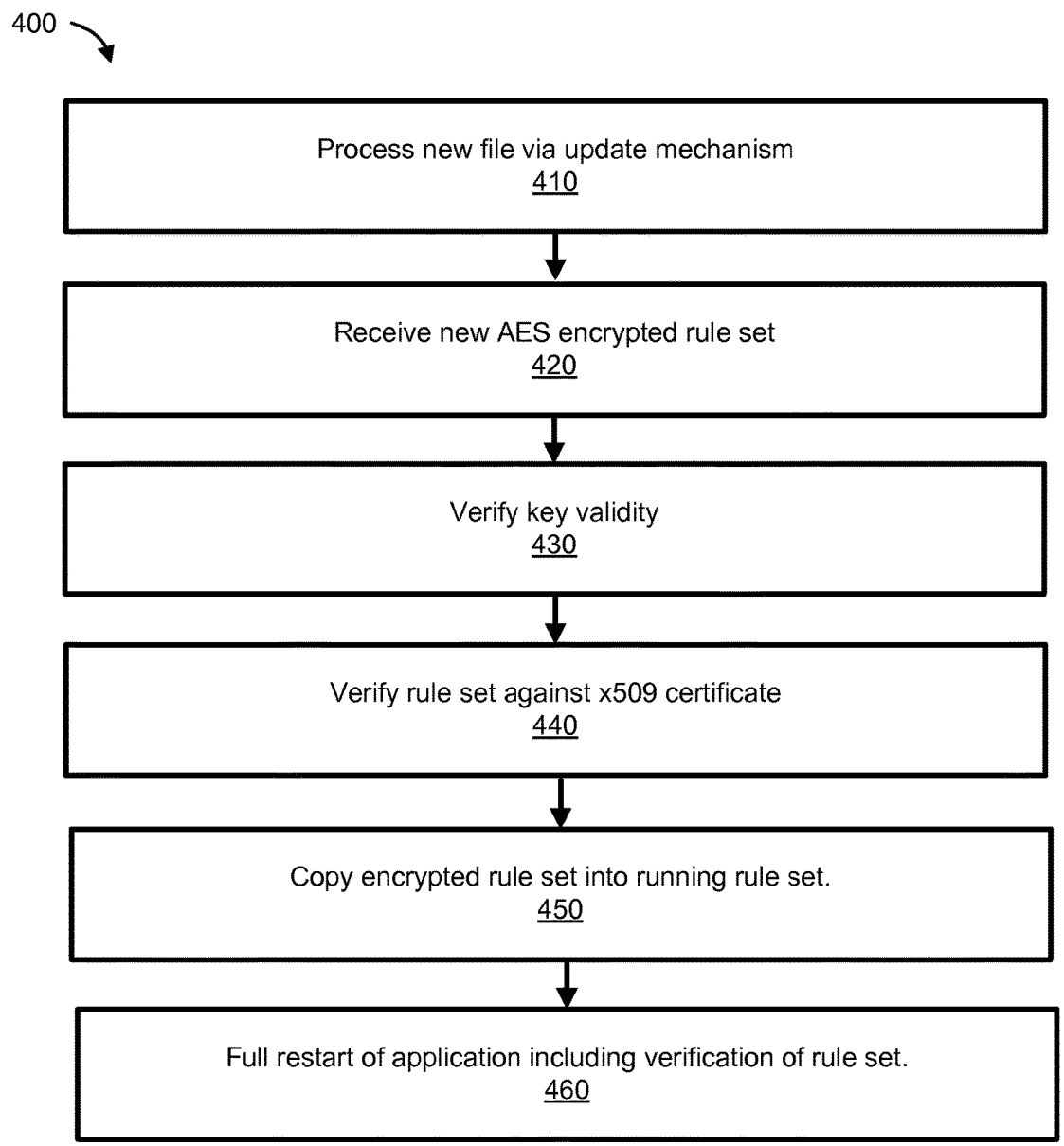
FIG. 4 is a flow diagram illustrating an example method of updating application rule sets according to exemplary embodiments of the present technology.

FIG. 4 is a flow diagram illustrating an example method 400 of ensuring that updates to system 100 are genuine and valid according to exemplary embodiments of the present technology. This ensures that a hacker cannot replace the system 100's rule set and bypass security. At step 410 a new file is processed by an update mechanism. In particular embodiments, a SOAP (Simple Object Access Protocol) update mechanism receives a new file over Ethernet or coded USB key. At step 420, a new AES encrypted rule set is received. System 100 additionally supports other encryption standards such as DES (Data Encryption Standard), 3DES (Triple DES), or ECC (Elliptic Curve Cryptography). At step 430, a CRL (certificate revocation list) is received from the enterprise PKI (public key infrastructure) system. System 100 checks its certificate against the CRL to verify that it's certificate is still valid or if it has been revoked. If system 100's certificate has been revoked, system 100 will enter a service only mode and notify the local IT department. Step 430 ensures that new updates designed to patch existing threats are not implemented or vulnerable on a compromised system. At step 440, the new rule set is validated against the x509 certificate. If the new rule set is validated, the new encrypted rule set is copied into the running rule set in step 450. At step 460, the application is restarted before running the new rule set in order to verify that the running rule set has always passed validation checks, is coded properly, and is run from a crypto-secure area. The method then continues from step 340 of FIG. 3.

In some embodiments, the individualized x509 certificate for each system 100 can be used to create a positive identification and two-way trust relationship with an enterprise system by providing authentication to both the industrial network via system 100, and to the enterprise network through the enterprise server's certificate. This makes system 100 immune to man-in-the-middle and replay cyber attacks. It also provides the enterprise with an authenticated and validated data source via system 100. Additionally, in various embodiments, system 100 includes a physical hardware tamper switch that ties a circuit board to the chassis. If someone were to open the chassis, an intrusion detection sanitization routine is run that destroys the secure software on the circuit board, such as erasing serialized x509 certificates and keys that allowed the boot process, leaving a device with limited functionality that boots and tells the user to send the device back to the manufacturer. The combination of the physical hardware tamper detection, certificate and key destruction, and application encryption ensures that someone cannot take the device apart and attempt hardware level attacks to get information out of the device to find out how it works or inject new keys directly into the hardware, which are security options usually reserved for the highest level of financial or government systems.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by programming instructions. These programming instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A system for providing intrusion detection for industrial control systems, comprising:
    at least one serial data link to communicate with serial-based networks;
    at least one Ethernet interface to communicate with industrial and enterprise networks;
    at least one processor and memory communicatively coupled to the processor, the memory storing instructions executable by the system;
    a protocol recognition engine executed by the processor and configured to break down an incoming data packet by protocol and integrate the data into an Ethernet framework;
    an industrial control system recognition application executed by the processor and configured to detect intrusions;
    a traffic analytics application executed by the processor and configured to analyze traffic activity for abnormal traffic activity;
    a logfile creation application executed by the processor and configured to poll industrial equipment and create a logfile of equipment statuses;
    a long term system deviation analysis application executed by the processor and configured to monitor raw data of the industrial equipment to create a profile of long term system activity;
    a rule set executed by the processor and configured to allow data that matches the rule set and flag data that does not match the rule set; and
    an alerts engine executed by the processor and configured to alert a system administrator of suspect activity;
    wherein the processor and memory communicatively coupled to the processor, the memory storing instructions executable by the system to perform a method of authenticating software incorporating enterprise grade security, the method comprising:
    serializing a certificate associated with the system;
    verifying a boot loader against the certificate;
    validating an operating system against the certificate;
    checking an application against the certificate;
    validating an application rule set against the certificate;
    encrypting the application in non-volatile storage; and
    executing the encrypted application through a cryptographic accelerator.

2. The system of claim 1, wherein the detection of intrusions by the industrial control system recognition application comprises:
    filter each message by source and destination;
    further filter each message by protocol;
    determine each message's intended function; and
    determine message quality.

3. The system of claim 2, wherein the filter each message by source and destination further comprises building a list of active participants on the network.

4. The system of claim 2, wherein the further filter each message by protocol and determine each message's intended function comprises determining whether a message is appropriate and allowed from the message source.

5. The system of claim 2, wherein the determine message quality comprises monitor mismatched cyclic redundancy checks (CRCs), mismatched data lengths, or invalid packets.

6. The system of claim 1, wherein the system further comprises a firewall to allow or block traffic to and from the at least one Ethernet interface.

7. The system of claim 1, wherein the system further comprises a user content configuration management executed by the processor and configured to allow the system administrator to define what messages and protocols the system administrator would like to be alerted on and the level of alerting.

8. The system of claim 1, wherein the system is housed in a fully sealed enclosure to withstand harsh environments.

9. The system of claim 8, wherein the harsh environments comprise high heat, humidity, explosive, chemical, and mobile environments.

10. The system of claim 8, wherein the system is certified as Class I Division II or higher to operate in environments where known explosive gases may exist.

11. The system of claim 8, wherein the system can function within the range of approximately −40° C. to +70° C.

12. The system of claim 8, wherein the fully sealed enclosure is IP67 certified.

13. The system of claim 1, wherein the processor is a trusted platform module (TPM) with a tamper resistant fused secure storage area.

14. The system of claim 1, wherein the processor and memory communicatively coupled to the processor, the memory storing instructions executable by the system to perform a method of updating the rule sets, the method comprising:

processing a new file by an update mechanism;
receiving a new encrypted rule set;
verifying validity of key received from the update mechanism;
verifying the new encrypted rule set against the certificate;
in response to the new encrypted rule set being verified, copying the new encrypted rule set into a running rule set; and
restarting the application to verify the new encrypted rule set is coded properly and run from a crypto-secure area.

15. A method for providing intrusion detection for industrial control systems, comprising:
receiving a data packet from an industrial control system;
breaking down, by a protocol recognition engine, the data packet by protocol and integrating the data into an Ethernet framework;
detecting intrusions, by an industrial control system recognition application;
analyzing traffic activity, by a traffic analytics application, for abnormal traffic activity;
polling industrial equipment, by a logfile creation application, and creating a logfile of equipment statuses;
monitoring raw data of the industrial equipment to create a profile of long term system activity, by a long term system deviation analysis application;
applying the data to rules or triggers;
alerting, by an alerts engine, a system administrator of suspect activity; and
authenticating software incorporating enterprise grade security comprising:
serializing a certificate associated with the system;
verifying a boot loader against the certificate;
validating an operating system against the certificate;
checking an application against the certificate;
validating an application rule set against the certificate;
encrypting the application in non-volatile storage; and
executing the encrypted application through a cryptographic accelerator.

16. The method of claim 15, wherein detecting intrusions, by the industrial control system recognition application comprises:
filtering each message by source and destination;
further filtering each message by protocol;
determining each message's intended function; and
determining message quality.

17. The method of claim 16, wherein the filtering each message by source and destination further comprises building a list of active participants on a network.

18. The method of claim 16, wherein the further filtering each message by protocol and determining each message's intended function comprises determining whether a message is appropriate and allowed from the message's source.

19. The method of claim 16, wherein the determining message quality comprises monitoring mismatched cyclic redundancy checks (CRCs), mismatched data lengths, or invalid packets.

20. The method of claim 15, further comprising updating rule sets comprising:
processing a new file by an update mechanism;
receiving a new encrypted rule set;
verifying validity of key received from the update mechanism;
verifying the new encrypted rule set against the certificate;
in response to the new encrypted rule set being verified, copying the new encrypted rule set into a running rule set; and
restarting the application to verify the new encrypted rule set is coded properly and run from a crypto-secure area.

21. A non-transitory computer-readable storage medium having embodied thereon instructions, which when executed by at least one processor, perform steps of a method, the method comprising:
receiving a data packet from an industrial control system;
breaking down, by a protocol recognition engine, the data packet by protocol and integrating the data into an Ethernet framework;
detecting intrusions, by an industrial control system recognition application;
analyzing traffic activity, by a traffic analytics application, for abnormal traffic activity;
polling industrial equipment, by a logfile creation application, and creating a logfile of equipment statuses;
monitoring raw data of the industrial equipment to create a profile of long term system activity, by a long term system deviation analysis application;
applying the data to rules or triggers;
alerting, by an alerts engine, a system administrator of suspect activity; and
authenticating software incorporating enterprise grade security comprising:
serializing a certificate associated with the system;
verifying a boot loader against the certificate;
validating an operating system against the certificate;
checking an application against the certificate;
validating the application rule set against the certificate;
encrypting the application in non-volatile storage; and
executing the encrypted application through a cryptographic accelerator.

* * * * *